United States Patent [19]

Lengyel

[11] Patent Number: 4,597,883

[45] Date of Patent: Jul. 1, 1986

[54] COMPOSITION AND METHOD FOR MINIMIZING FROST DAMAGE TO PLANTS

[76] Inventor: Albin D. Lengyel, 2417 E. Indian School Rd., Phoenix, Ariz. 85064

[21] Appl. No.: 733,894

[22] Filed: May 14, 1985

Related U.S. Application Data

[63] Continuation-in-part of Ser. No. 667,328, Nov. 1, 1984, abandoned.

[51] Int. Cl.$^4$ .................... C09K 3/18; A01G 13/00
[52] U.S. Cl. ............................. 252/70; 47/2
[58] Field of Search .......................... 252/70; 47/2

[56] References Cited

U.S. PATENT DOCUMENTS 3,555,727  1/1971  Jaquith ........................ 47/2

FOREIGN PATENT DOCUMENTS 42563  12/1971  Japan.

OTHER PUBLICATIONS

Mikul'skaya, "Effect of Different Forms of Potassium Fertilizers on the Respiratory Gas Exchange of Sugar Beet Leaves," Fotosin. Ustoich. Rast., 1973, 39–44.
Kharin et al., "Crystallization of Sucrose in the Presence of Calcium Chloride and Potassium Nitrate," Sakh. Prom. 1972, 9, 21–3. (CA 77:166474).

*Primary Examiner*—Robert A. Wax
*Attorney, Agent, or Firm*—Drummond & Nissle

[57] ABSTRACT

An improved frost protection composition for plants. The composition includes sugar, potassium sulfate, iron chelate and manganese chelate dissolved in water. The composition is applied directly to the foliage and fruit of a plant prior to the plant's being subjected to freezing temperatures.

16 Claims, No Drawings

COMPOSITION AND METHOD FOR MINIMIZING FROST DAMAGE TO PLANTS

This application is a continuation-in-part of application Ser. No. 667,328, filed Nov. 1, 1984, now abandoned.

This invention relates to a composition and method for protecting plant life from injury which normally results when the temperature of ambient air falls below freezing.

More particularly, the invention relates to a composition which, when applied to the foliage of a plant, minimizes frost damage to the plant by reducing the respiration and transpiration of the plant.

Multimillion dollar losses periodically occur in the citrus industry when the temperature of the ambient air unexpectedly falls below freezing and damages or destroys the foliage and fruit carried on trees in orange, lemon, lime and grapefruit orchards. Smudge pots and other conventional processes utilized to prevent frost damage to citrus trees experience only limited success, especially when the ambient temperature falls well below freezing for any substantial length of time. At present, there does not appear to be an inexpensive, simple procedure for providing fruit trees and other types of plants with protection from frost damage during extended periods of freezing ambient temperatures.

In accordance with the invention, I have now discovered a new composition and method which effectively protects fruit trees and other plant life from frost damage. The new composition is inexpensive to produce and utilize and provides fruit and vegetable plants with a substantial amount of protection from frost damage during extended periods of freezing temperatures. My new composition comprises an aqueous solution of sugar, potassium sulfate, iron chelate or iron sulfate, and manganese chelate or manganese sulfate. Magnesium sulfate may also be added to the solution. The solution is utilized by spraying it directly on the foliage, flowers and/or fruit of a plant at an appropriate time prior to the occurrence of freezing ambient temperatures.

Preferably 0.1 to 3.0 pounds of sugar, 0.1 to 3.0 pounds of potassium sulfate, 0.01 to 0.5 pounds of iron chelate or iron sulfate, and 0.01 to 0.5 pounds of manganese chelate or manganese sulfate is utilized per gallon of water. Each gallon of water may also include 0.01 to 1.5 pounds of magnesium sulfate.

The sugar utilized in preparing the frost protection solution of the invention may include fructose, glucose, sucrose and other monosaccharides, disaccharides, aldoses and ketoses. When sucrose is utilized it is believed to form invert sugar in the aqueous solution. Potassium nitrate may be utilized in combination with or in the place of potassium sulfate.

The aqueous solution of the invention is believed to slow the respiration and transpiration of a plant to improve the plant's ability to resist frost damage. The heavy metals—potassium, iron, manganese and magnesium—in the aqueous solution are believed to replace sodium chloride in the foliage and fruit of a plant while the sugar or sugars in the solution decrease the water or moisture content of the cells of the plant.

In use, desired quantities of sugar, potassium sulfate, iron chelate, manganese chelate, and magnesium sulfate are dissolved in a volume of water. The aqueous solution of sugar, potassium sulfate, iron chelate, manganese chelate and magnesium sulfate is then foliarly sprayed directly on a plant, preferably at least two days prior to the plant's being subjected to freezing ambient temperatures. If the frost protection solution is applied less than two days prior to the occurrence of freezing ambient temperatures, the degree of frost damage protection afforded by the solution decreases. For instance, when the aqueous composition of the invention is applied one day prior to the occurrence of freezing ambient temperatures, the frost damage to a plant is typically about 30% to 50% greater than when the composition is applied to the plant two days prior to the occurrence of the freezing temperatures. If the composition is applied an hour or two prior to a freeze, little or no frost damage protection is afforded the plant. On the other hand, when the aqueous solution of the invention is applied to a plant more than two days in advance of a freeze, the solution appears to permit the plant to increase its resistance to frost damage over an extended period of time. Plants sprayed with the frost protection solution of the invention thirty (30) days prior to a freeze appear to suffer less frost damage from the freeze than a plant which has not been sprayed with the solution.

The frost protection compositions disclosed herein can be applied to vegetable plants such as lettuce, tomato, potato, celery, carrot, and avocado plants, and to fruit trees including cherry, apricot, pear, plum, apple, peach, orange, lemon, lime, grapefruit and cranberry trees.

In formulating the frost protection formulation of the invention, I have also discovered that potassium hydroxide can be utilized in place of or in combination with potassium sulfate and/or potassium nitrate.

The following examples are presented, not by way of limitation of the scope of the invention, but to illustrate to those skilled in the art, the practice of various of the presently preferred embodiments of the invention and to distinguish the invention from the prior art.

EXAMPLE 1

Ten pounds of sucrose, ten pounds of potassium sulfate, two pounds of iron chelate, and one pound of manganese chelate were dissolved in fifteen gallons of water at 76 degrees Fahrenheit to form a frost protection solution in accordance with the invention. The solution was sprayed directly on the foliage and green fruit of a lemon tree. When the tree was sprayed, the ambient temperature was 76 degrees Fahrenheit. After two days, a first cutting was taken from the lemon tree and the lower end of the cutting placed in a container of clean water. At the same time the first cutting was taken, a second cutting was taken from another nearby lemon tree which had not been sprayed with the frost protection composition of the invention. The lower end of the second cutting was also placed in a container of clean water.

The first and second cuttings were, for a period of two (2) hours, exposed to ambient air having a temperature of 23 degrees Fahrenheit and were then maintained in air having a temperature of approximately 75 degrees Fahrenheit for twenty-four (24) hours.

After the cuttings had been removed from the 23 degree Fahrenheit air and maintained at 75 degrees Fahrenheit for twenty-four hours, the leaves and green fruit on each cutting were examined. The leaves of the first cutting were slightly singed along their peripheral edges. The green fruit on the first cutting appeared undamaged. The leaves and fruit on the second cutting were severely damaged and were dead or dying.

The iron and manganese chelates utilized in formulating the aqueous frost protection solution of Example 1 comprised iron and manganese in combination with the chelating agent EDTA.

EXAMPLE 2

Fifteen pounds of sucrose, fifteen pounds of potassium sulfate, two pounds of iron chelate, and one pound of manganese chelate were dissolved in fifteen gallons of water at 76 degrees Fahrenheit to form a frost protection solution. The solution was sprayed directly on the foliage and green fruit of a peach tree. When the peach tree was sprayed the ambient temperature was 76 degrees Fahrenheit. After two days, a first cutting was taken from the peach tree and the lower end of the cutting placed in a container of clean water. At the same time the first cutting was taken, a second cutting was taken from another nearby peach tree which had not been sprayed with the frost protection composition of the invention. The lower end of the second cutting was also placed in a container of clean water.

The first and second cuttings were, for a period of two (2) hours, exposed to ambient air having a temperature of 23 degrees Fahrenheit and were then, for a period of twenty-four (24) hours, maintained in air having a temperature of approximately 75 degrees Fahrenheit.

After the cuttings had been removed from the 23 degree Fahrenheit air and maintained in the 75 degree Fahrenheit air for twenty-four hours, the leaves and green fruit on each cutting were examined. The leaves of the first cutting were slightly singed along their outer edges. The green fruit on the first cutting appeared undamaged. The leaves and fruit on the second cutting were severely injured and were dead or dying.

The iron and manganese chelates utilized in formulating the aqueous frost protection solution of Example 2 comprised iron and manganese in combination with the chelating agent lignin sulfonate.

EXAMPLE 3

Fifteen pounds of sucrose, ten pounds of potassium sulfate, two pounds of iron chelate, one and a half pounds of manganese chelate and one pound of magnesium sulfate were dissolved in fifteen gallons of water at 76 degrees Fahrenheit to form a frost protection solution. The solution was directly sprayed on the foliage and green fruit of an orange tree. The ambient temperature was 76 degrees Fahrenheit when the tree was sprayed. After five days, a first cutting was taken from the orange tree and the lower end of the cutting placed in a container of clean water. At the same time the first cutting was taken, a second cutting was taken from another nearby oragne tree which had not been sprayed with the frost protection composition of the invention. The lower end of the second cutting was also placed in a container of clean water.

The first and second cuttings were, for a period of eight (8) hours, exposed to ambient air having a temperature of 25 degrees Fahrenheit and were then, for a period of twenty-four (24) hours, maintained in air having a temperature of approximately 76 degrees Fahrenheit.

After the cuttings had been removed from the 25 degree Fahrenheit air and maintained in the 76 degree Fahrenheit air for twenty-four hours, the leaves and green fruit on each cutting were examined. The leaves of the first cutting were slightly singed along their outer edges. The green fruit of the first cutting appeared undamaged. The leaves and fruit of the second cutting were severely injured and were dead or dying.

The iron and manganese chelates utilized in formulating the aqueous frost protection solution of Example 3 comprised iron and manganese in combination with the chelating agent EDTA. The magnesium sulfate utilized comprised epsom salts.

EXAMPLE 4

The aqueous frost protection solution of Example 1 was prepared and utilized as described in Example 1, except that ten pounds of potassium nitrate were utilized in place of the potassium sulfate. Results similar to those in Example 1 were obtained.

EXAMPLE 5

The aqueous frost protection solution of Example 1 was prepared and utilized as described in Example 1, except that two pounds of ferric sulfate (conquimbite) were utilized in place of the iron chelate. Results similar to those in Example 1 were obtained.

EXAMPLE 6

The aqueous frost protection solution of Example 1 was prepared and utilized as described in Example 1, except that two pounds of manganese sulfate were utilized in place of the manganese chelate. Results similar to those in Example 1 were obtained. The manganese sulfate comprised $MnSO_4.4H_2O$.

EXAMPLE 7

The aqueous frost protection solution of Example 1 was prepared and utilized as described in Example 1, except that eight pounds of potassium hydroxide were utilized in place of the potassium sulfate. Results similar to those in Example 1 were obtained.

As utilized herein, the term iron sulfate includes water soluble ferric and ferrous sulfates including $Fe_2(SO_4)_3$, $Fe_2(SO_4)_3.9H_2O$, $Fe_2SO_4.5H_2O$, and $FeSO_4.7H_2O$; the term manganese sulfate includes $Mn_2(SO_4)_3$, $MnSO_4$ and $MnSO_4.(n)H_2O$, where $n=1$ to 7; potassium sulfate refers to any water soluble potassium sulfate including $K_2SO_4$ and $K_2S_2O_7$; potassium nitrate refers to water soluble potassium nitrate; magnesium sulfate includes $MgSO_4$ and epsom salts; and, the terms iron chelate and manganese chelate refer to iron and manganese in combination with the organic compound EDTA (ethylene diamine tetra acetic acid), lignin sulfonate (typically a by-product of the pulp industry) and/or other appropriate chelating agents. As utilized herein the expression "water soluble" refers to chemicals which will partially or completely dissolve or decompose in water at least one water temperature in the range between the freezing and boiling temperatures of water.

Having described my invention in such terms as to enable those skilled in the art to which it pertains to understand and practice it, and having described the presently preferred embodiments thereof, I claim:

1. An aqueous composition for minimizing frost damage to a plant, said composition including in each gallon of water 0.1 to 2.0 pounds of sugar and 0.1 to 2.0 pounds of at least one potassium chemical selected from the group consisting of potassium sulfate and potassium nitrate.

2. The composition of claim 1 including in each gallon of water 0.01 to 0.5 pounds of at least one iron chemical selected from the group consisting of iron chelated with ethylene diamine tetra acetic acid, iron chelated with lignin sulfonate, and water soluble ferric and ferrous sulfates.

3. The composition of claim 1 including in each gallon 0.01 to 0.5 pounds of at least one manganese chemical selected from the group consisting of manganese chelated with ethylene diamine tetra acetic acid, manganese chelated with lignin sulfonate, and water soluble manganese sulfates.

4. The composition of claim 2 including in each gallon 0.01 to 0.5 pounds of at least one manganese chemical selected from the group consisting of manganese chelated with ethylene diamine tetra acetic acid, manganese chelated with lignin sulfonate, and water soluble manganese sulfates.

5. The composition of claim 2 including in each gallon 0.01 to 1.5 pounds of a water soluble magnesium sulfate.

6. The composition of claim 3 including in each gallon 0.01 to 1.5 pounds of a water soluble magnesium sulfate.

7. The composition of claim 4 including in each gallon 0.01 to 1.5 pounds of a water soluble magnesium sulfate.

8. A method for minimizing the frost damage to a plant comprising applying to the plant an aqueous solution containing in each gallon of water 0.1 to 2.0 pounds of sugar and 0.1 to 2.0 pounds of at least one potassium chemical selected from the group consisting of potassium sulfate and potassium nitrate.

9. The method of claim 8 wherein each gallon includes at least one of
(a) 0.01 to 0.5 pounds of at least one manganese chemical selected from the group consisting of manganese chelated with ethylene diamine tetra acetic acid, manganese chelated with lignin sulfonate, and water soluble manganese sulfates;
(b) 0.01 to 0.5 pounds of at least one iron chemical selected from the group consisting of iron chelated with ethylene diamine tetra acetic acid, iron chelated with lignin sulfonate, and water soluble ferric and ferrous sulfates; and,
(c) 0.01 to 1.5 pounds of a water soluble magnesium sulfate.

10. The aqueous composition of claim 1 wherein said at least one potassium chemical is selected from the group consisting of potassium sulfate, potassium nitrate and potassium hydroxide.

11. The aqueous composition of claim 2 wherein said at least one potassium chemical is selected from the group consisting of potassium sulfate, potassium nitrate and potassium hydroxide.

12. The aqueous composition of claim 3 wherein said at least one potassium chemical is selected from the group consisting of potassium sulfate, potassium nitrate and potassium hydroxide.

13. The aqueous composition of claim 4 wherein said at least one potassium chemical is selected from the group consisting of potassium sulfate, potassium nitrate and potassium hydroxide.

14. The aqueous composition of claim 5 wherein said at least one potassium chemical is selected from the group consisting of potassium sulfate, potassium nitrate and potassium hydroxide.

15. The aqueous composition of claim 6 wherein said at least one potassium chemical is selected from the group consisting of potassium sulfate, potassium nitrate and potassium hydroxide.

16. The aqueous composition of claim 7 wherein said at least one potassium chemical is selected from the group consisting of potassium sulfate, potassium nitrate and potassium hydroxide.

* * * * *